United States Patent
Napadow et al.

(10) Patent No.: US 10,752,235 B2
(45) Date of Patent: Aug. 25, 2020

(54) METHOD FOR OPERATING A HYBRID VEHICLE

(71) Applicant: VOLVO TRUCK CORPORATION, Göteborg (SE)

(72) Inventors: Gabriel Napadow, Göteborg (SE); Patrice Keghelian, Lyons (FR); Henrik Olsson, Mölndal (SE); Andreas Carlén, Göteborg (SE); Erik Lauri, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 18 days.

(21) Appl. No.: 16/097,626

(22) PCT Filed: May 3, 2016

(86) PCT No.: PCT/EP2016/059919
§ 371 (c)(1),
(2) Date: Oct. 30, 2018

(87) PCT Pub. No.: WO2017/190771
PCT Pub. Date: Nov. 9, 2017

(65) Prior Publication Data
US 2019/0152467 A1 May 23, 2019

(51) Int. Cl.
*B60W 20/16* (2016.01)
*B60W 10/06* (2006.01)
(Continued)

(52) U.S. Cl.
CPC .............. *B60W 20/16* (2016.01); *B60K 6/48* (2013.01); *B60W 10/06* (2013.01); *B60W 10/08* (2013.01);
(Continued)

(58) Field of Classification Search
CPC .... B60W 10/06; B60W 20/16; Y10S 903/905
See application file for complete search history.

(56) References Cited

U.S. PATENT DOCUMENTS

2010/0044131 A1  2/2010  Teraya
2012/0310458 A1* 12/2012  Nawata ................. B60K 6/445
                                                         701/22

FOREIGN PATENT DOCUMENTS

EP    2083156 A1    7/2009
EP    2433842 A1    3/2012
(Continued)

OTHER PUBLICATIONS

International Search Report (Jan. 19, 2017) for corresponding International App. PCT/EP2016/059919.

*Primary Examiner* — Kenneth J Malkowski
(74) *Attorney, Agent, or Firm* — Venable LLP; Jeffri A. Kaminski

(57) ABSTRACT

A method for controlling a hybrid vehicle propulsion system that includes an internal combustion engine and an exhaust after treatment device for treating exhaust gases from the engine includes determining during operation of the vehicle a value of a parameter indicative of an efficiency of the exhaust after treatment device, identifying a vehicle operation cycle start event, determining during the operation of the vehicle an engine operation history characteristic for a time interval after the vehicle operation cycle start event, and determining whether or not to control the propulsion system so as to increase the efficiency of the exhaust after treatment device, in dependence on the determined exhaust after treatment device efficiency parameter value and the determined engine operation history characteristic.

17 Claims, 3 Drawing Sheets

(51) Int. Cl.
*B60W 10/08* (2006.01)
*B60W 10/10* (2012.01)
*B60W 20/00* (2016.01)
*B60K 6/48* (2007.10)
*B60W 20/40* (2016.01)
*B60W 50/00* (2006.01)

(52) U.S. Cl.
CPC ............ *B60W 10/10* (2013.01); *B60W 20/00* (2013.01); *B60W 20/40* (2013.01); *B60W 50/00* (2013.01); *B60W 2050/0089* (2013.01); *B60W 2300/10* (2013.01); *B60W 2300/12* (2013.01); *B60W 2510/068* (2013.01); *B60W 2510/244* (2013.01); *B60W 2556/50* (2020.02); *B60W 2710/0666* (2013.01); *B60W 2710/083* (2013.01); *B60W 2710/1005* (2013.01); *B60Y 2200/92* (2013.01); *Y02T 10/6286* (2013.01)

(56) References Cited

FOREIGN PATENT DOCUMENTS

| | | |
|---|---|---|
| EP | 2620343 A2 | 7/2013 |
| EP | 2799300 A1 | 11/2014 |
| WO | 2011024038 A1 | 3/2011 |

* cited by examiner

METHOD FOR OPERATING A HYBRID VEHICLE

BACKGROUND AND SUMMARY

The invention relates to a method for operating a hybrid vehicle comprising an internal combustion engine and an exhaust after treatment device for treating exhaust gases from the engine. The invention further relates to a computer program, a computer readable medium, a control unit, a hybrid vehicle propulsion system and hybrid vehicle.

The invention can be applied in heavy-duty vehicles, such as trucks, buses and construction equipment. Although the invention will be described with respect to a bus, the invention is not restricted to this particular vehicle, but may also be used in other vehicles such as cars.

In a hybrid electric vehicle there is an aim to keep emissions from the internal combustion engine as low as possible. A further aim is to control the propulsion system for an optimal energy use efficiency in view of the operational circumstances. Thereby, the engine may be turned off or operating a low load during extensive time periods or during time periods occurring at high frequencies. As a result the temperature of an exhaust after treatment device of the engine, such as a selective catalytic reduction (SCR) unit, may fall below a point at which the device works effectively. This problem may be particularly pronounced in hybrid electric buses or delivery vehicles operating in urban areas.

WO2013188513 discloses a hybrid electric vehicle in which, during an electric mode of the vehicle, the internal combustion engine is turned on in case the catalyst efficient falls below a threshold. However, running the engine for this purpose may compromise said aim to provide an optimal energy use efficiency.

It is desirable to move the operation of a hybrid vehicle closer to an optimal balance between keeping emissions from the internal combustion engine as low as possible, and obtaining a maximum energy use efficiency.

According to an aspect of the invention a method is provided for controlling a hybrid vehicle propulsion system comprising an internal combustion engine and an exhaust after treatment device for treating exhaust gases from the engine, the method comprising determining during operation of the vehicle a value of a parameter indicative of an efficiency of the exhaust after treatment device, characterized by identifying a vehicle operation cycle start event, determining during the operation of the vehicle an engine operation history characteristic for a time interval after the vehicle operation cycle start event, and determining whether or not to control the propulsion system so as to increase the efficiency of the exhaust after treatment device, in dependence on the determined exhaust after treatment device efficiency parameter value and the determined engine operation history characteristic.

The exhaust after treatment device may be any such device suitable for the engine type provided. E.g. where the engine is a diesel engine, the exhaust after treatment device may be a selective catalytic reduction (SCR) unit. It should be noted however, that the invention is applicable where the exhaust after treatment device is of another type, in particular of a type requiring a temperature above a minimum temperature for operating fully efficiently.

Determining whether or not to control the propulsion system so as to increase the efficiency of the exhaust after treatment device may comprise determining whether or not to control the engine so as to run. Where said parameter value indicates that the exhaust after treatment device efficiency is low, controlling the engine so as to run may improve the efficiency of the exhaust after treatment device. For example, running the engine may increase the temperature of the exhaust after treatment device, thereby increasing its efficiency. This may contribute to keeping the emissions of the engine as low as possible.

However, identifying the vehicle operation cycle start event, and determining during the operation of the vehicle the engine operation history characteristic for the time interval after the vehicle operation cycle start event provides a strong indication of whether increasing the exhaust after treatment device efficiency is useful during the operational circumstances at the time. E.g. where the engine operation history characteristic indicates that the engine has been shut down since the vehicle operation start event, it may be reasonable to assume that the engine will continue to be shut down for a relatively long time period to come.

For example, where the hybrid vehicle is a hybrid electric vehicle and where the engine has been shut down since the vehicle operation start event, the reason might be that the vehicle is in a prolonged fully electric propulsion mode, in which all propulsion power is provided by an electric motor powered by a battery pack. Thereby, the vehicle operation cycle start event may be an event involving charging of the battery pack from an external power source, e.g. at a charging station. The fully charged battery pack and the operational circumstances may allow the vehicle to be driven in the fully electric propulsion mode for a relatively long time before the engine is needed for propulsion assistance.

If in such a situation, the propulsion system is controlled so as to increase the efficiency of the exhaust after treatment device, this control action may be followed by a further engine shutdown period long enough for the exhaust after treatment device to once again lose efficiency. Therefore, said control action will have had no benefit. For example, if the engine is started to increase the temperature of the exhaust after treatment device, the result may only be that once the exhaust after treatment device has become fully efficient, the engine is shut down for a further extended time period and the exhaust after treatment device temperature will again it so as to render the device less efficient. As a consequence, running the engine will have merely caused an increased fuel consumption and hence a reduced energy use efficiency. In addition, emissions will have increased due to the engine having been running as opposed to having been shut down.

Thus, the engine operation history characteristic may be used as an indication that the engine will remain shut down for yet some time to come, and that running it to increase the exhaust after treatment device efficiency will serve no purpose. Instead the engine may be kept shut down, and turned on later for some other reason such as the engine being needed for supporting the vehicle propulsion. It should be noted that in some embodiments the engine may be turned on for charging the battery pack.

However, where the engine operation history characteristic suggests that the engine has been running to a relatively large extent since the vehicle operation cycle start event, this may indicate that the vehicle is in an operational mode in which the engine is frequently turned on to support the vehicle propulsion. In such a situation it is reasonable to assume that where the engine is turned off, it will be turned on again within a relatively short time period. Therefore, the interest of keeping emissions low will be served by running the engine to increase the temperature of the exhaust after treatment device in order to avoid its efficiency dropping during a time period when the engine is turned off.

Thereby the engine may be controlled so as to run although there is no other control function for the propulsion system, e.g. vehicle propulsion, requesting that the engine is controlled so as to run. Where the increase of the efficiency of the exhaust after treatment device is the only control object causing a request that the engine is controlled so as to run, the engine may be kept at idle during vehicle standstill.

It is understood that said time interval after the vehicle operation cycle start event may be the time from the vehicle operation cycle start event to the time of the determination of the engine operation history characteristic, and/or the determination of the exhaust after treatment device efficiency parameter value. Alternatively, said time interval may start at some point in time after the vehicle operation cycle start event and/or it may end at some point in time before the determination of the engine operation history characteristic and/or the determination of the exhaust after treatment device efficiency parameter value.

It is also understood that the determination whether or not to control the propulsion system so as to increase the efficiency of the exhaust after treatment device may be made regardless whether the engine is turned off or whether it is already running when the determination is made. However, in some embodiments the method may comprise determining during the operation of the vehicle whether or not the engine is running, and, if it is determined that the engine is not running, determining whether or not to control the engine so as be started, in dependence on the determined exhaust after treatment device efficiency parameter value and the determined engine operation history characteristic.

In some embodiments, the control of the propulsion system so as to increase the efficiency of the exhaust after treatment device, may be disabled e.g. where the vehicle is in an "electric zone", i.e. an area in which regulations prohibit internal combustion engines to be operated. The positioning of the vehicle in such an area may be done e.g. by means of a global positioning system (GPS) device.

The control of the propulsion system so as to increase the efficiency of the exhaust after treatment device may include at least one additional control action other than controlling the engine so as to run. One or more of such additional control actions may be performed in parallel to the control of the engine so as to run. They are particularly beneficial in cases where the engine is started after having been shut down for a relatively long period of time. A cool engine running might actually contribute to decreasing the exhaust after treatment device temperature rather than increasing it. An additional control action so as to increase the efficiency may counteract such an effect of a cool engine.

For example, where the engine is connectable to wheels of a vehicle in which the propulsion system is arranged, via a transmission, the control of the propulsion system so as to increase the efficiency of the exhaust after treatment device may comprise adjusting a gear shift strategy of the transmission. The adjusted gear shift strategy may involve using lower gears at vehicle start from standstill to increase the heat from engine.

An advantageous additional control action so as to increase the efficiency of the exhaust after treatment device may be provided where the hybrid vehicle propulsion system is a hybrid electric vehicle propulsion system comprising an electric motor, wherein the engine and the motor are arranged to deliver in parallel a combined torque to at least one wheel of a vehicle in which the propulsion system is arranged. Such a propulsion system may be referred to as a parallel hybrid vehicle propulsion system. Thereby, the control of the propulsion system so as to increase the efficiency of the exhaust after treatment device may comprise decreasing a portion of the combined torque delivered by the motor. This may involve decreasing the electric motor boost while the engine is engaged in the vehicle propulsion. For example, the allowance of the motor to assist the engine during vehicle acceleration may be limited. The increased engine work may increase the heat produced by the engine so as to increase the temperature of the exhaust after treatment device.

In another additional control action so as to increase the efficiency of the exhaust after treatment device, the control of the propulsion system so as to increase the efficiency of the exhaust after treatment device may comprise control of the engine so as to run in a high heat mode. Such a high heat mode is adapted to quickly heat the engine, the exhaust gases and/or the exhaust after treatment device. The high heat mode may involve an increased fuel flow to the engine, an adjusted, e.g. late, fuel injection timing, an adjusted, e.g. early, exhaust valve opening (where a variable valve timing system is provided), actuation of exhaust gas recirculation (EGR), suitable control of an air intake throttle, and/or suitable control of a variable geometry turbocharger (VGT) of the engine.

In some embodiments, the control of the propulsion system so as to increase the efficiency of the exhaust after treatment device may include only controlling the engine so as to run, without any additional control action as exemplified above.

Determining the engine operation history characteristic for the time interval after the vehicle operation cycle start event may comprise determining an extent to which the engine has been running since the vehicle operation cycle start event, which in turn may comprise determining whether or not the engine has been running at any point in time since the vehicle operation cycle start event. Thus, the determination of the extent to which the engine has been running since the vehicle operation cycle start event may involve determining whether or not the engine has been running for more than zero seconds at least once. Thereby the indication of whether or not increasing the exhaust after treatment device efficiency is useful during the operational circumstances at the time is reinforced.

The engine operation history may be stored in a data storage which is accessible to a control unit for controlling the propulsion system. As an alternative to determining whether or not the engine has been running at any point in time since the vehicle operation cycle start event, determining the engine operation history characteristic may involve determining whether or not the engine has been running continuously for a time exceeding a predetermined time interval threshold.

Preferably, the exhaust after treatment device efficiency parameter is a temperature of the exhaust after treatment device, the method comprising comparing the determined temperature to a threshold temperature which preferably is predetermined. Thereby, a strong indication is given whether the exhaust after treatment device is operating efficiently, e.g. where the device is a selective catalytic reduction (SCR) unit. Alternatively, or in addition, other parameters may be used for determining the efficiency of the exhaust after treatment device, such as the change of the temperature of the exhaust after treatment device, or, where the exhaust after treatment device is an SCR unit, the size of the urea buffer therein.

Preferably, determining whether or not to control the propulsion system so as to increase the efficiency of the exhaust after treatment device, e.g. by controlling the engine so as to run, comprises determining to control the propulsion system so as to increase the efficiency of the exhaust after treatment device if the determined temperature is below the threshold value and if the engine has been running more than to a predetermined extent since the vehicle operation cycle start event. Preferably, determining whether or not to control the propulsion system so as to increase the efficiency of the exhaust after treatment device, e.g. by controlling the engine so as to run, comprises determining to not control the propulsion system so as to increase the efficiency of the exhaust after treatment device if the determined temperature is below the threshold value and if the engine has been running less than to a predetermined extent since the vehicle operation cycle start event. Thereby uselessly, in view of the operational circumstances, increasing the exhaust after treatment device efficiency may be effectively avoided. In some embodiments, such as an embodiment described above, the predetermined extent to which the engine has been running may be that the engine has been running to any extent, regardless of the size of the extent. In such embodiments it may be determined to not control the propulsion system so as to increase the efficiency of the exhaust after treatment device if the determined temperature is below the threshold value and if the engine has not been running since the vehicle operation cycle start event.

After the vehicle operation cycle start event, the engine may be controlled so as to run more than to the predetermined extent based on at least one additional condition, which is not the determined temperature being below the threshold value, and subsequently it may be determined to control the engine so as to run if the determined temperature is below the threshold value.

The additional condition may be e.g., where the system is a parallel hybrid vehicle propulsion system, that a propulsion torque request exceeds the available torque capacity of an electric motor of the propulsion system. The additional condition may alternatively or in addition be that one or more auxiliary devices of the vehicle needs power from the engine. The additional condition may in some embodiments be that a battery pack of the propulsion system needs charging. If the engine is controlled so as to start running due to the additional condition being fulfilled, and subsequently the additional condition is not fulfilled anymore, the engine might be controlled so as to continue running due to the determined exhaust after treatment device temperature being below the threshold value.

As understood from the description above, when the additional condition is fulfilled and the determined temperature is below the threshold value, the control of the propulsion system so as to increase the efficiency of the exhaust after treatment device may include control actions in addition to controlling the engine so as to run, e.g. adjusting a gear shift strategy of the transmission, decreasing a portion of the torque delivered to the wheels by the electric motor, and/or control of the engine so as to run in a high heat mode.

Preferably, the step of determining the engine operation history characteristic is performed substantially simultaneously to the step of determining the exhaust after treatment device efficiency parameter value. This may provide a large degree of correlation between the determined exhaust after treatment device efficiency parameter value and the determined engine operation history characteristic. In turn this may improve the accuracy of the control of the hybrid vehicle propulsion system.

The vehicle operation cycle start event may be a start of a predetermined route of a vehicle provided with the propulsion system. For example, the predetermined route may be a bus route, or a delivery route. A delivery route may be followed e.g. by a truck or a car, for example in a shipping or postal delivery system. Information about the predetermined route may be stored so as to be accessible to a control unit for the propulsion system. In addition, information about the position of the vehicle, e.g. from a global positioning system (GPS) device, may be accessible to the control unit. Upon matching the vehicle position with the origin of the predetermined route, the vehicle operation cycle start event nay be identified.

In addition or alternatively, the predetermined route may be determined by means of a navigation planning device. Such a device may include e.g. a GPS device. The device may be fitted in a car, e.g. for private use. A control unit of the propulsion system may be arranged to receive information from the navigation planning device. Upon a planned route being determined by the navigation planning device, e.g. based on input from a person, the vehicle operation cycle start event may be identified.

In some embodiments, where the hybrid vehicle propulsion system is a hybrid electric vehicle propulsion system comprising an electric motor and an electric energy storage arrangement, e.g. a battery pack, the vehicle operation cycle start event may be charging of the electric energy storage arrangement. Thereby, based on the assumption that after such charging the propulsion system may be able to operate mostly or entirely in a fully electric mode during a relatively long period of time after the charging event, it can be decided that the control of the propulsion system so as to increase the efficiency of the exhaust after treatment device may be omitted even if the exhaust after treatment device efficiency of low, since it can be assumed that the fully electric mode will continue for a further extended time period. Thereby, a useless exhaust after treatment device efficiency increasing action may be omitted.

Where the hybrid vehicle propulsion system is a plug-in hybrid electric vehicle propulsion system comprising an electric motor and an electric energy storage arrangement, identifying the vehicle operation cycle start event may comprise identifying charging of the electric energy storage arrangement from a source externally of the vehicle. A control unit for the propulsion system may be arranged to detect such external charging. Thereby, the vehicle operation cycle start event may be positively and securely identified. Since a plug-in hybrid electric vehicle propulsion system may have a particularly large battery pack, it can be expected that after an external charging event, the vehicle may be operating in a fully electric mode for a relatively long period of time. As understood from the description above, embodiments of the invention will provide for useless exhaust after treatment device efficiency increasing actions being avoided during the fully electric mode of the plug-in hybrid electric vehicle following the external charging event.

In some embodiments, where the hybrid vehicle propulsion system is a hybrid electric vehicle propulsion system comprising an electric motor and an electric energy storage arrangement, identifying the vehicle operation cycle start event comprises identifying a positive change of a state of charge of the electric energy storage arrangement. Such a positive change of the state of charge may signify a charging event, which may be provided by means of an external source. In some embodiments, a positive change of the state of charge may signify an internal charging event in the system, e.g. by means of the engine. Preferably, it is determined whether or not the positive change of the state of charge is above a predetermined threshold value. If the positive change of the state of charge is above the predetermined threshold value, it may be assumed that the charging event is followed by an extended fully electric mode of the vehicle. Thereby, the vehicle operation cycle start event may be positively and securely identified, and useless exhaust after treatment device efficiency increasing actions ma be avoided during the fully electric mode. In alternative embodiments, identifying the vehicle operation cycle start event comprises determining that a state of charge of the electric energy storage arrangement is above a predetermined threshold value.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
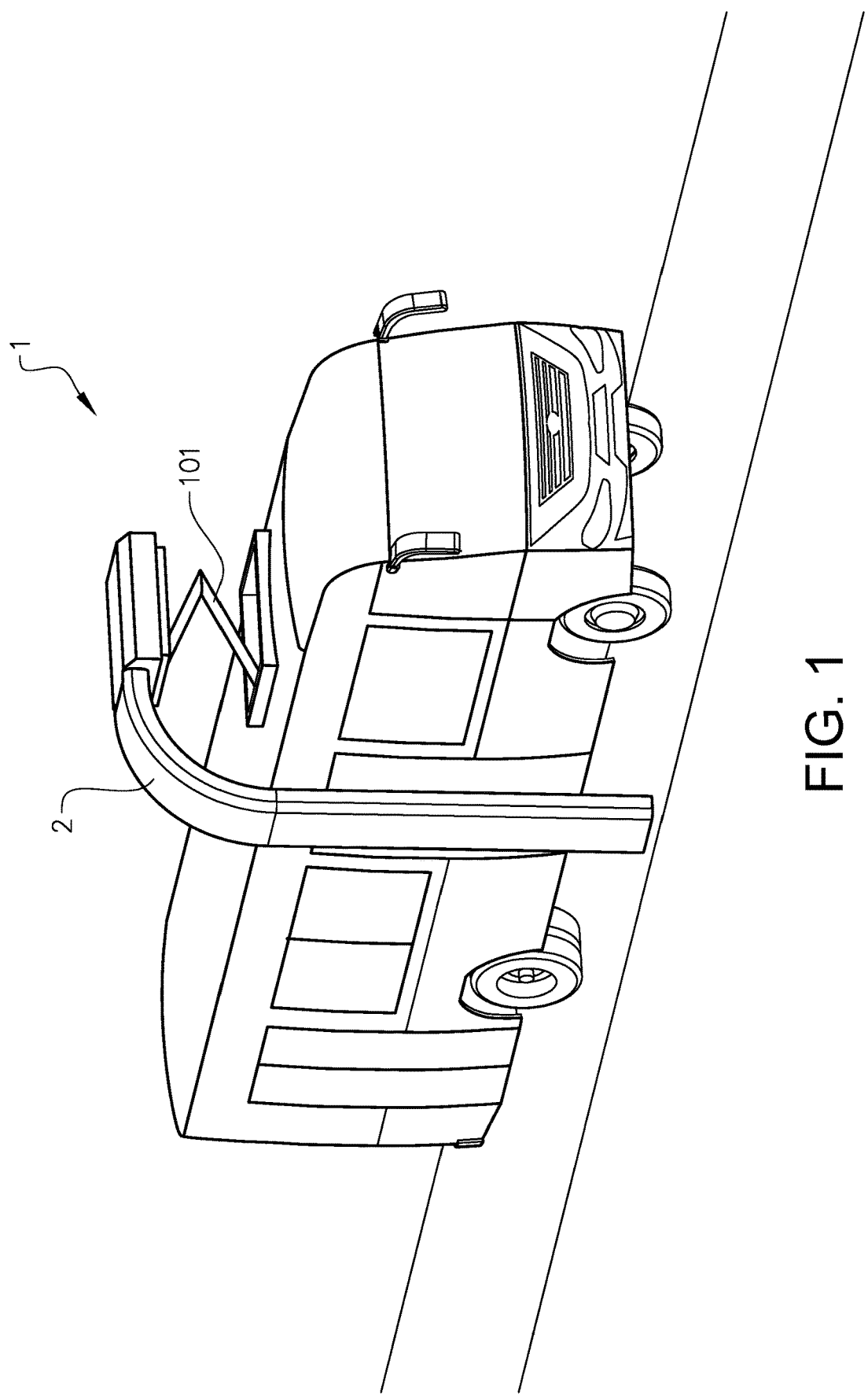
FIG. 1 is a perspective view of a vehicle in the form of a bus.

FIG. 1 shows a vehicle in the form of a bus 1. It should be noted that the vehicle can be of a variety of alternative types, e.g. it may be a truck, e.g. a tractor for a semitrailer, a car or a working machine such as a wheel loader. The vehicle 1 is a plug-in hybrid electric vehicle comprising a hybrid electric vehicle (HEV) propulsion system, more specifically a parallel hybrid system. The system comprises a battery pack described below, arranged to be charged at a charging station via a roof mounted pantograph 101 of the vehicle 1. The charging station comprises a vertical post 2 bent at the top so as to allow the vehicle to park under a set of electrodes at a distal end of the post 2. In this position of the vehicle the pantograph 101 may be unfolded so as for electrodes thereon to come into contact with the electrodes in the post 2.

Figure 2:
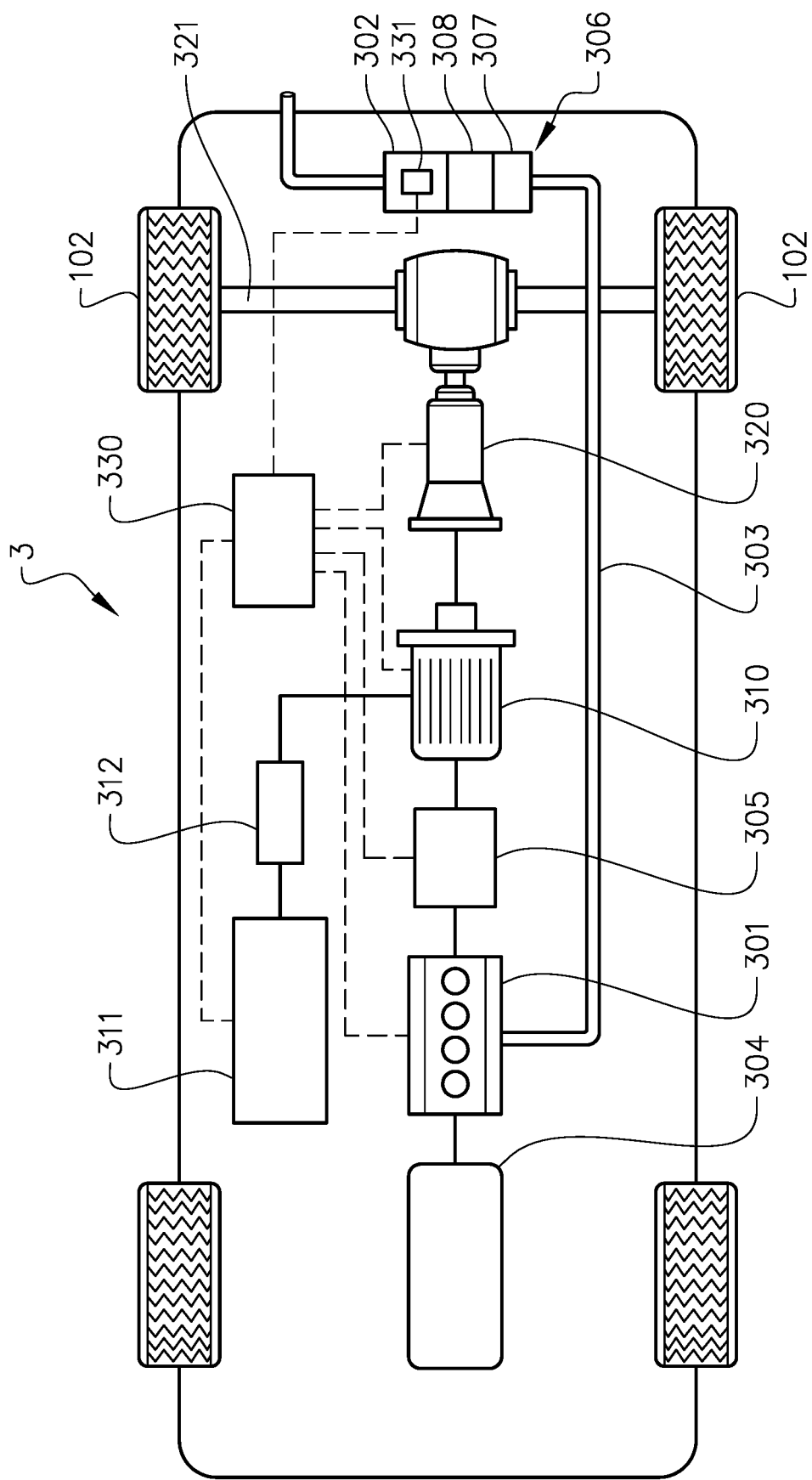
FIG. 2 shows schematically a hybrid vehicle propulsion system in the vehicle in FIG. 1.

As can be seen in FIG. 2, the hybrid electric vehicle propulsion system 3 comprises an internal combustion engine 301, and an exhaust after treatment system 306 for treating exhaust gases from the engine. The engine is in this example a diesel piston engine 301. The exhaust after treatment system 306 comprises in this example a diesel oxidation catalyst (DOC) 307, a diesel particulate filer (DPF) 308 and an exhaust after treatment device 302 in the form of a selective catalytic reduction (SCR) unit. An exhaust guide 303 is provided for guiding exhaust gases from the engine to the atmosphere the exhaust after treatment system 306. The engine 301 is fed with fuel from a fuel container 304.

The system 3 further comprises a motor-generator 310, herein also referred to as a motor 310. The engine 301 is mechanically connectable to a rotor of the motor 310 via a clutch 305, and the motor 310 is mechanically connected to a transmission 320. The transmission 320 is mechanically connected via a torque transmitting assembly 321 to two wheels 102 of the vehicle 1 for its propulsion. The torque transmitting assembly 321 may comprise a urchin shaft, a wheel axle and a differential gear.

The system 3 also comprises an electric energy storage arrangement in the form of a battery pack 311. The battery pack 311 is electrically connected to the motor 310 via an inverter 312.

The system 3 also comprises a control unit 330 which is arranged to send and receive control signals from each of the engine 301, the clutch 305, the motor 310, the transmission 320 and the battery pack 311. Further the control unit is arranged to receive signals from a temperature sensor 331 arranged to detect the temperature in the exhaust after treatment device 302. In alternative embodiments, the control unit 330 may be arranged to determine the temperature of the exhaust after treatment device 302, in this example the SCR unit, based on other parameters. For example, the control unit 330 may be arranged to determine the SCR unit temperature using a model and measures values of various engine operation parameters, such as the temperature of the DPF 308 and the air flow into the engine. It is understood that the control unit 330 may be provided as a single unit, or as a plurality of units arranged to communicate with each other. For example, is some embodiments, an engine electric control unit (ECU), a battery ECU and a HEV ECU may be arranged to control respective parts of the system and to communicate with each other.

The transmission 320 is adapted to provide a power split function between the engine 301, the motor 310 and the torque transmitting assembly 321. The system 3 is arranged to operate in a number of different modes. More specifically, the system 3 is arranged to operate in a fully electric propulsion mode, in which the engine is turned off, the clutch 305 is disengaged, and all power to the wheels 102 is provided by the motor 310 via the transmission, the motor 310 being powered by the battery pack 311 via the inverter 312, in a parallel propulsion mode, the clutch 305 is engaged and the engine 301 and the motor 310 are both providing power to the wheels 102 via the transmission 320. In a regenerative braking mode, a braking torque is provided by the motor 310 to the wheels 102, whereby the motor works as a generator and charges the battery pack via the inverter 311. In an engine mode, all power to the wheels 102 are provided by the engine 301. In some embodiments power may be provided by the engine 301 to the motor 310, which then works as a generator to charge the battery pack 311 via the inverter 312.

It is understood the invention is applicable to hybrid electric vehicle propulsion systems where components are arranged differently from that of the parallel hybrid system in FIG. 2. For example, in an alternative parallel hybrid system the engine 301, the motor 310 and the transmission 320 may be connected via a planet gear set.

Figure 3:
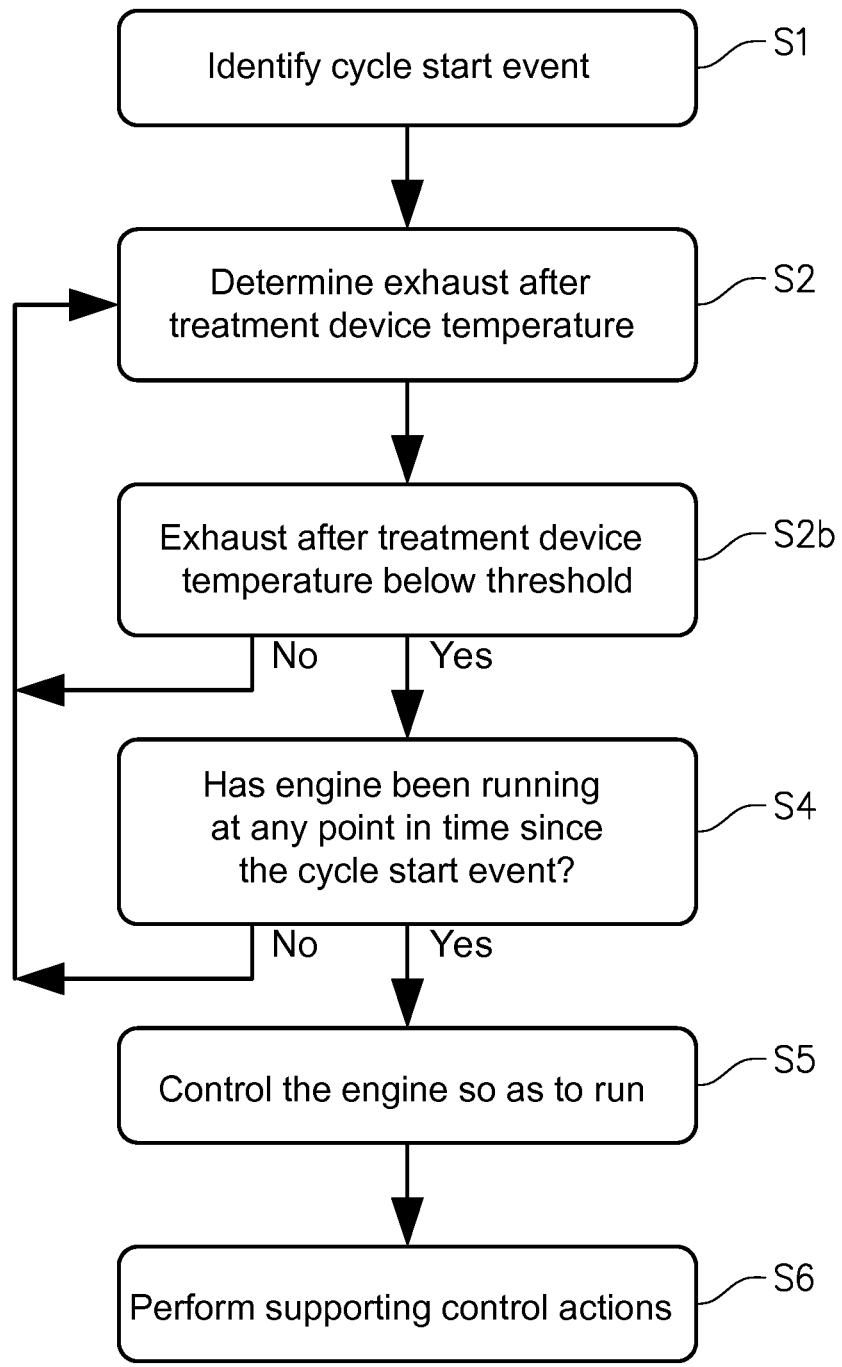
FIG. 3 is a block diagram depicting steps in a method of controlling the system in FIG. 2.

Referring to FIG. 3 steps in a method of controlling the system in FIG. 2 will be described. The method comprises identifying S1 a vehicle operation cycle start event. This is done by detecting that the battery pack 311 is charged by an external source, e.g. as shown in FIG. 1 by the electrodes of the pantograph 101 being in contact with the electrodes in the post 2 of the charging station.

After the vehicle operation cycle start event, the vehicle is driven in the fully electric mode, and the engine 301 is turned off. During the operation of the vehicle the temperature of the exhaust after treatment device 302 is repetitively determined S2 and compared S2b to a predetermined threshold temperature.

If it is determined S2b that said temperature is below the threshold value, an engine operation history characteristic for a time interval after the vehicle operation cycle start event is determined S4. This determination comprises determining S4 whether or not the engine has been running at any point in time since the vehicle operation cycle start event.

If it is determined S4 that the engine has not been running at any point in time since the vehicle operation cycle start event, e.g. due to the fully electric mode, the next step in the method is simply to repeat the temperature determination S2. However, if it is determined S4 that the engine has been running at some point in time since the vehicle operation cycle start event, the engine is controlled S5 so as to run, so as to increase the temperature of the exhaust after treatment device 302.

The reason for the engine having been running after the vehicle operation cycle start event may be an additional condition other than the determined temperature being below the threshold value, e.g. vehicle propulsion assistance by the engine 301. If the engine is controlled so as to start running due to the additional condition being fulfilled, and subsequently the additional condition is not fulfilled anymore, the engine 301 might be controlled so as to continue running due to the determined exhaust after treatment device temperature being below the threshold value.

When it is determined to control S5 the engine so as to run, so as to increase the temperature of the exhaust after treatment device 302, a number of additional control actions are performed S6, as described above, so as to support the increase of the temperature of the exhaust after treatment device 302.

The additional control actions include adjusting a gear shift strategy of the transmission, so that lower gears are used at vehicle start from standstill, which will increase the heat from engine. Also, the portion of the combined torque delivered by the motor 310 to the wheels 102 is decreased. The resulting increased engine work will further increase the heat produced by the engine so as to increase the temperature of the exhaust after treatment device 302. In addition, the engine 301 is controlled so as to run in a high heat mode involving an increased fuel flow to the engine, an adjusted fuel injection timing, actuation of exhaust gas recirculation (not shown), suitable control of an air intake throttle, and suitable control of a variable geometry turbocharger (not shown) of the engine.

It should be noted that in alternative embodiments, identifying S1 the vehicle operation cycle start event may comprise, as described above, identifying a start of a predetermined route of the vehicle, identifying a positive change of a state of charge of the battery pack 311, or determining that a state of charge of the battery pack 311 is above a predetermined threshold value.

It is to be understood that the present invention is not limited to the embodiments described above and illustrated in the drawings; rather, the skilled person will recognize that many changes and modifications may be made within the scope of the appended claims.

The invention claimed is:

1. A method for controlling a hybrid vehicle propulsion system comprising an internal combustion engine and an exhaust after treatment device for treating exhaust gases from the engine, the method comprising:
    determining during operation of the vehicle a value of a parameter indicative of an efficiency of the exhaust after treatment device, wherein the exhaust after treatment device efficiency parameter value is a temperature of the exhaust after treatment device,
    comparing the determined temperature to a threshold temperature value,
    identifying a vehicle operation cycle start event, determining during the operation of the vehicle an engine operation history characteristic for a time interval after the vehicle operation cycle start event, and further comprising determining an extent to which the engine has been running since the vehicle operation cycle start event and
    determining whether or not to control the propulsion system so as to increase the efficiency of the exhaust after treatment device, in dependence on the determined temperature and the determined engine operation history characteristic, and further determining not to control the propulsion system so as to increase the efficiency of the exhaust after treatment device if the determined temperature is below the threshold temperature value and if the engine has been running less than to a predetermined extent since the vehicle operation cycle start event.

2. A method according to claim 1, wherein determining whether or not to control the propulsion system so as to increase the efficiency of the exhaust after treatment device comprises determining whether or not to control the engine so as to run.

3. A method according to claim 1, where the engine is connectable to wheels of a vehicle, in which the propulsion system is arranged, via a transmission, wherein the control of the propulsion system so as to increase the efficiency of the exhaust after treatment device comprises adjusting a gear shift strategy of the transmission.

4. A method according to claim 1, where the hybrid vehicle propulsion system is a hybrid electric vehicle propulsion system comprising an electric motor, wherein the engine and the motor are arranged to deliver in parallel a combined torque to at least one wheel of a vehicle in which the propulsion system is arranged, wherein the control of the propulsion system so as to increase the efficiency of the exhaust after treatment device comprises decreasing a portion of the combined torque delivered by the motor.

5. A method according to claim 1, wherein determining the extent to which the engine has been running since the vehicle operation cycle start event comprises determining whether or not the engine has been running at any point in time since the vehicle operation cycle start event.

6. A method according to claim 1, wherein the exhaust after treatment device efficiency parameter is a temperature of the exhaust after treatment device, the method comprising comparing the determined temperature to a threshold temperature, and wherein determining whether or not to control the propulsion system so as to increase the efficiency of the exhaust after treatment device comprises determining to control the propulsion system so as to increase the efficiency of the exhaust after treatment device if the determined temperature is below the threshold value and if the engine has been running more than to a predetermined extent since the vehicle operation cycle start event.

7. A method according to claim 6, comprising controlling, after the vehicle operation cycle start event, the engine so as to run more than to the predetermined extent based on at least one additional condition, which is not the determined temperature being below the threshold value, and subsequently determining to control the engine so as to run if the determined temperature is below the threshold value.

8. A method according to claim 1, wherein the step of determining the engine operation history characteristic is performed substantially simultaneously to the step of determining the exhaust after treatment device efficiency parameter value.

9. A method according to claim 1, wherein the hybrid vehicle propulsion system is a hybrid electric vehicle propulsion system comprising an electric motor and an electric energy storage arrangement, wherein the vehicle operation cycle start event is charging of the electric energy storage arrangement.

10. A method according to claim 1, where the hybrid vehicle propulsion system is a plug-in hybrid electric vehicle propulsion system comprising an electric motor and an electric energy storage arrangement, wherein identifying the vehicle operation cycle start event comprises identifying charging of the electric energy storage arrangement from a source externally of the vehicle.

11. A method according to claim 1, where the hybrid vehicle propulsion system is a hybrid electric vehicle propulsion system comprising an electric motor and an electric energy storage arrangement, wherein identifying the vehicle operation cycle start event comprises identifying a positive change of a state of charge of the electric energy storage arrangement.

12. A method according to claim 1, where the hybrid vehicle propulsion system is a hybrid electric vehicle propulsion system comprising an electric motor and an electric energy storage arrangement, wherein identifying the vehicle operation cycle start event comprises determining that a state of charge of the electric energy storage arrangement is above a predetermined threshold value.

13. A computer comprising a computer program for performing the steps of claim 1 when the program is run on the computer.

14. A non-transitory computer readable medium carrying a computer program for performing the steps of claim 1 when the program product is run on a computer.

15. A control unit configured to perform the steps of the method according to claim 1.

16. A hybrid vehicle propulsion system comprising a control unit according to claim 15.

17. A hybrid vehicle comprising a hybrid vehicle propulsion system according to claim 16.

* * * * *